United States Patent [19]

James et al.

[11] Patent Number: 4,744,896

[45] Date of Patent: May 17, 1988

[54] FILTER APPARATUS FOR WATER WELLS

[76] Inventors: Andrew James; Jessie James, both of P.O. Box 433, Gonzales, La. 70707

[21] Appl. No.: 7,676

[22] Filed: Jan. 28, 1987

[51] Int. Cl.$^4$ ............................................. B01D 35/02
[52] U.S. Cl. .................................... 210/170; 210/306; 210/446
[58] Field of Search ............... 210/302, 303, 305, 306, 210/312, 170, 435, 441, 446, 455, 457, 484, 485

[56] References Cited

U.S. PATENT DOCUMENTS

| | | | |
|---|---|---|---|
| 1,424,197 | 8/1922 | Gebhard | 210/303 X |
| 1,468,906 | 9/1923 | Inman | 210/306 |
| 1,809,429 | 6/1931 | Sturgis | 210/312 X |
| 2,697,523 | 12/1954 | Bloksma | 210/303 |
| 2,823,804 | 2/1958 | Myring | 210/305 |
| 3,550,776 | 12/1970 | Hamilton | 210/312 X |

*Primary Examiner*—Tom Wyse
*Attorney, Agent, or Firm*—Pravel, Gambrell, Hewitt, Kimball & Krieger

[57] ABSTRACT

A filtration apparatus positionable along the water line intermediate the water well and the surface pump which is drawing the water from the well to the final destination. The apparatus includes a filter, a primary filter housing attachable on its ends along the water line having an out-take and an outflow, the housing containing a primary filter element which includes an exterior filter support screen and an interior filtration element so that water flowing into the housing flows exterior to the filter and is filtered through the filter element into the internal portion of the filter and out the intake line. Any sand or the like material which is collected on the exterior of the filter element is, being heavier than the water flow, flows downward to an exit spout containing a collection chamber connected thereto, so that the sand or the like material falls into the collection chamber and is not maintained on the exterior of the filter element.

10 Claims, 2 Drawing Sheets

FILTER APPARATUS FOR WATER WELLS

BACKGROUND OF THE INVENTION

1. Field of the Invention

The present invention relates to water well filtration. More particularly, the present invention relates to an apparatus positionable in the flow line from a water well for filtering out any sand or other matter from the water flow and depositing the matter in a depository below the line while allowing the continuing flow of the water through the line.

2. General Background

In the recovery of water from a water table below the surface of the earth, wells are normally drilled to a certain depth beneath the surface, depending on the geographical location of the water source, and portable water is recovered through a recovery pipe of the well and the water is pumped to the end destination, which is normally a home, business or the like. The type of wells which are normally set in the earth at their deepest most point an elongated filter screen together with the surrounding gravel or rock medium help to filter out any finer particles which may carry by the flow of water into the well bore. Normally this primary filter screen on the well pipe will be sufficient to produce water which is not contaminated with sand or the like particles. However, often times the case is that as a well becomes aged, or the strata in the lower end portion of the well may change, the filter screen may erode away, so that normally filtered sand or the like particles are no longer blocked from entry into the well bore, and the sand is carried up through the well bore through the water line and often times results in the water itself having sand or the like particles contained therein.

The only options in the present state of the art in eliminating this problem is to dig a new well which is of course a costly undertaking, and the cost be often prohibitive as an option. The second option which is being undertaking at this time is to place filter elements along the water line which are removable type filter elements that help to filter out some of the sand which is being carried in the water. Such filter elements are inadequate in that they (a) must be changed quite often once they become saturated with sand or the like, and (b) due to the type mesh of the element, often causes a back pressure on the well which may cause the well to either shut down or produce an inadequate flow of water to the final destination.

Several patents have been obtained which address the filtration of water or fluids in the flow line, the most pertinent being as follows:

U.S. Pat. No. 3,834,539, entitled "Trap For Removing Solid Particles From A Liquid Circulating System", provides a trap for removing solid particles greater than the predetermined size from a liquid circulating system such as a water cooled internal combustion engine. The trap contains a filter element contained in a T type unit, so that the flow may continue through the unit yet the trapped particles fall to the lower end of the filter element.

U.S. Pat. No. 4,064,046, entitled "Self Cleaning Filter Apparatus", which includes a filter casing having an output from the casing for a connection to a water distribution system and an input for a connection to a water pump for receiving water from a water source. An elongated filter support is attached over one end of the output and extended to the filter casing. The input to the filter casing directs the input water parallel to an adjacent to the filter screen away from the output so that the filter screen is continually flush from the side by the liquid driving the trash towards one end of the casing and creating a turbulence for loosening the trash caught in the filter.

U.S. Pat. No. 898,567, entitled "Gasoline Filter", relates to a filter device set in a gas line to remove impurities and settlement from gasoline and to separate any water which may be contained in the gasoline. The device includes a lower cup portion whereas heavier and oil gasoline water would settle into the cup portion in addition to the filtration element contained within the filter.

U.S. Pat. No. 2,329,987, entitled "Strainer Device For Liquids", having a main casing with perforate wall sections to admit liquid to be strained in its interior with the preliminary effect to first remove core solid material and bag-like filtering means which strain the smaller solid matter within the filter element.

U.S. Pat. No. 2,305,351, entitled "Liquid Straining Apparatus", which includes a strainer for protecting the strainer screen against damage by relatively large objects carried along by the liquid together with a means for cleaning the outer surface and the perforations of the screen without seriously impeding the free-flow of water through the strainer.

U.S. Pat. No. 2,644,585, entitled "Leader Drain Trap", relates to an apparatus for preventing leaves and other objects which find their way into roof drain gutters from clogging the leader drain and thereby causing water to back-up and damage the roof. The apparatus contains a filter screen contained within a filter body, so that the leaves and the like are maintained separate from the leader trap and are trapped there within.

U.S. Pat. No. 2,270,116, entitled "Screen and Trap Attachment", relates to an attachment for connection to the take-in of a gasoline dispensing line to eliminate the passage of moisture condensates from the bottom of a gasoline tank into the gasoline during delivery into the tank, and at the same time screening or filtering the gasoline before it enters the dispensing line.

U.S. Pat. No. 1,905,919, entitled "Irrigation Pipe Screen", relates to a screen position on the intake portion of a irrigation pipe so that water which flows into the irrigation pipe is filtered and any large contaminates or the like are prevented from entering the pipe during the use of the apparatus.

SUMMARY OF THE PRESENT INVENTION

The apparatus of the present invention solves problems confronted in the water well art in a simple and straight-forward manner. What is provided is a filtration apparatus positionable along the water line intermediate the water well and the surface pump which is drawing the water from the well to the final destination. The apparatus would include a primary filter housing attachable on its ends along the water line having an intake and an outflow. The housing contains a primary filter element which includes an exterior filter support screen and an interior filtration element so that water flowing into the housing flows exterior to the filter and is filtered through the filter element into the internal portion of the filter and out the outflow line. Any sand or the like material which as collected on the exterior of the filter element, being heavier than the water flow, flows downward to an exit spout containing a collection chamber connected thereto, so that the sand or the like material falls into the collection chamber and is not maintained on the exterior of the filter element. Further, there may be provided a stop-cock between the filter housing and the collection chamber to prevent flow into the collection chamber in the event the collection chamber has to be changed while the filtration process is continuing. There is further provided a clean-out on the top portion of the filter housing to assist in cleaning the interior of the housing when necessary.

Therefore, it is a principal object of the present invention to provide a filter within the downstream of the water well for filtering any material which may be carried up the well bore;

It is a further principal object of the present invention to provide a filter element contained within the water line downstream from the water well and upstream from the water pump which includes a collection chamber for collecting any particles filtered out the water flow at a point exterior to the filter chamber itself;

It is still a further object of the present invention to provide a filtration apparatus wherein a permanent filter element is provided within a filter chamber and is easily accessible during when the filter chamber must be cleaned or the like.

DETAILED DESCRIPTION OF THE PREFERRED EMBODIMENT

Figure 1:
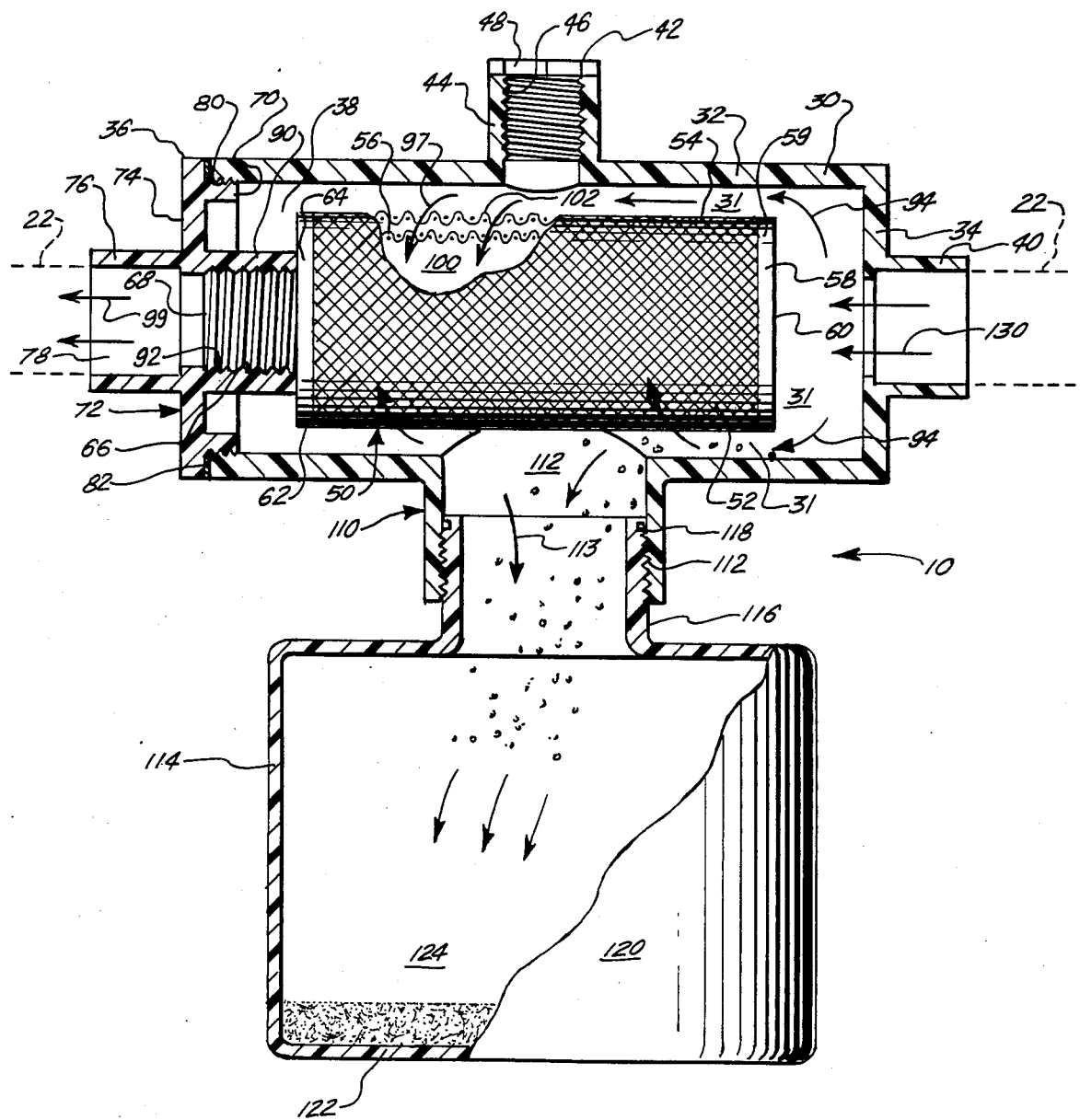
FIG. 1 is an overall side cut-away of the preferred embodiment of the apparatus of the present invention.
Figure 2:
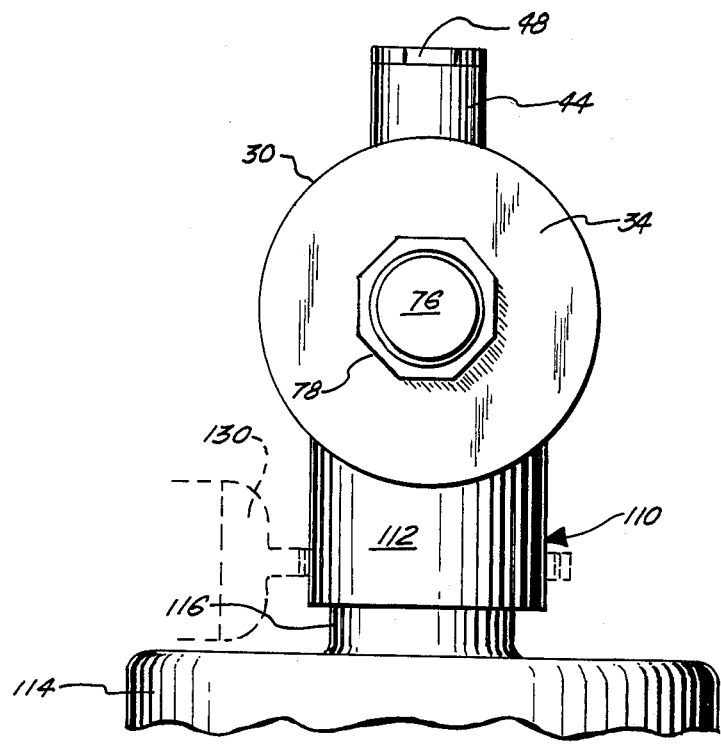
FIG. 2 is an end view of the preferred embodiment of the apparatus of the present invention.
Figure 3:
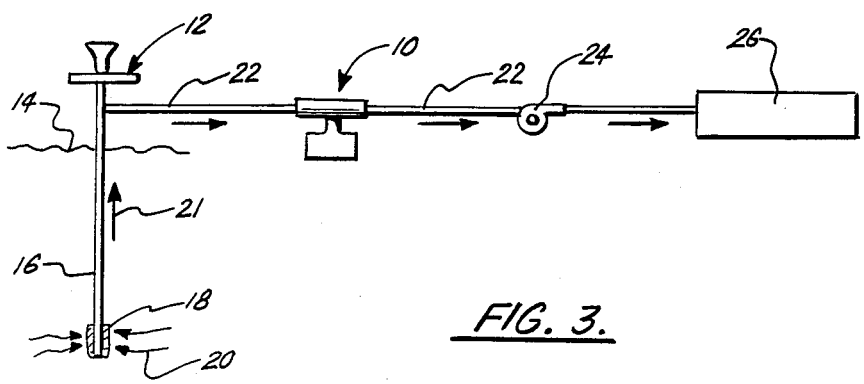
FIG. 3 is an overall view of the apparatus of the present invention utilized in the overall water system.

FIGS. 1 through 3 illustrate the preferred embodiment of the apparatus of the present invention by the numeral 10. For purposes of illustration of the apparatus 10 being utilized in a water system, reference is made to FIG. 3. In FIG. 3 there is illustrated a water well 12 drilled beneath the earth's surface 14 having a well pipe 16 drilled to a level beneath the earth with a primary filter screen 18 on its lowermost portion for allowing the flow of water from the surrounding earth strata as indicated by arrow 20 up the flow pipe 16 as indicated by arrow 21 and into a water flow line 22 the flow of water being pumped out of well 12 by water pump 24 contained within flow line 22 and to a final destination of a home or business or the like 26. FIG. 3 also illustrates that filtration apparatus 10, the present invention, would be situated along line 22 upstream of water well 12 yet downstream of pump 24, i.e. intermediate the well 12 and pump 24. This would achieve the maximum filtration effect of apparatus 10, the structure and functioning of which will be discussed as seen in FIGS. 1 and 2.

Turning now to FIG. 1, apparatus 10 is illustrated in full view. In the Figure, apparatus 10 would include a primary filtration housing 30 which, as seen in end view in FIG. 2, would be a cylindrical housing having a continuous sidewall 32, a first end portion 34 and second end portion 36, the wall portion 32 and end portions 34 and 36 defining a filtration chamber 38 there within. It should be noted that structural housing 30 includes on its first end portion 34 an intake attachment nipple 40 protruding outward from end portion 34 which is frictionally engaged into the water line 22 as illustrated in phantom view in the FIGURE. For purposes of connection, the connection between nipple 40 and line 22 could be via gluing or the other like means.

Housing 32 also includes on its uppermost wall portion clean out means 42 which would include an upper depending nipple portion 44 having an internal thread members 46 wherein a cap 48 would be threadably engaged thereto when the filtration unit is in use, but could be removable for cleaning out the interior of the filtration chamber 38 when the need arose.

Housed within filtration filter housing 30, is a primary filtration means 50 which would comprise an essentially elongated filter element 52 having an annular exterior support filter screen 54 and an internal filter or filtration surface 56, which would comprise a fine mesh screen, having absolute filtration capabilities of a size substantially known in the art as 40 mesh filter screen. The exterior support screen 54 and filtration screen 56 would define an annular continuous filtration surface along the length of filtration element 50 for undertaking the filtration of the water flowing therethrough. Further, filtration screen 50 comprises an end plate 58 having an annular wall portion 59 for engaging around the exterior of external screen 54 and providing a support on its end portion, and a solid end face 60 which will allow no water flow therethrough. On the second end there is provided a second end plate 62 again having an annular wall portion 64 for engaging the second end of the support screen 54 so that the support screen 54 is confined on its two end portions by end plates 60 and 62. However, plate 62 would also include a threadable connector portion 66 having a fluid flow bore 68 therethrough for receiving water flow from filter element 50, and containing threads 70 on its outermost surface for threadably engaging housing 30 as will be discussed further.

For purposes of structure, it should be noted that first intake portion 34 of filter 30 has an integral end wall portion 34 with nipple portion 40 protruding therefrom which is integral to the sidewall 32 of the filter housing. However, the second end of filter housing 30 would include a removal end cap 72, likewise having a flat end face 74 wherein a nipple 76 with a flow bore 78 therethrough for communicating with flow bore 68 and serving to receive the outflow of water from the filter during the filtration process. Cap 72 is removable from filter housing 30 via threaded collar portion 80 which would threadably engage the interior wall 32 of housing 30 there being included an annular gasket 82 between the face 74 of cap 72 and the end of wall 32 of housing 30 so that no leakage would occur from that connecting point.

Further, cap 72 would include a means for attaching the filtration element 50 within housing 30. This means would include an internal threaded neck member 90 which has internal threads 92 which threadably engage threaded neck portion 70 of filtration element 50 as was discussed earlier. Therefore, upon filtration element 50 being threadably engaged upon neck portion 90, and cap 72 threadably engaged to housing 30, filtration element is supported within housing 30 as seen in FIG. 1, with screen 54 serving as adequate external support to maintain filter 30 positioned within housing 30 during the filtration process.

It should be noted for purposes of structure, that the exterior diameter of filtration element 50 is somewhat less than the overall internal diameter of housing 30 to define a fluid flow space 31. This is so to accommodate fluid flow completely around filter element 30 as seen by arrows 94, so that fluid flowing through this fluid flow space 31 will have access to the entire annular filtration surface 52 of filtration element 50 during the filtration process.

As seen in the Figures, since the filtration element 50 is attached to the outflow point of filter housing 30, therefore any fluid flow within housing 30 must naturally flow into an internal flow space 100 within filtration element 50 and out through flow bore 68 in order to pass through housing 30. Therefore, naturally, the sand or the like which is collected during the filtration process would be collected and the external surface 102 of the filtration screen 56 and would be deposited along the external surface throughout the annular wall 52 of the filter element 50. Since the foreign matter, such as sand or the like, is collected in this manner, the sand or debris would not be maintained on this external surface but would tend to be washed from the external surface and, naturally, being heavier than water would tend to settle to the bottom of the filter housing 30.

Therefore, in order to accommodate this flow of sand or the like to the lower portion of filter housing 30, housing 30 would further include a means for collecting the filtered debris at a point which is exterior to the filter housing itself. This means would include an outlet spout 110 on the lowermost wall of filter housing 30, the outlet spout having an annular threaded throat member 112 of broadened diameter which would threadably engage a collection container 114. Collection container 114 would have an upper threadable throat portion 116 for threadably engaging spout 112, with a fluid sealing ring 118 positioned intermediate throat portion 116 and member 112 so as to prevent any leakage exterior to the apparatus. For purposes of structure, collection portion 114 would substantially be annular container jar or the like having a continuous wall portion 120 floor portion 122 for defining a debris collection chamber 124 there within. Therefore, any sand or the like being filtered out of the flow of water flowing into internal filtration zone 100 would tend to fall to the bottom of chamber 30 and be directed to flow spout 112 into collection chamber 114.

For purposes of structure and functioning, it should be noted that arrows 130 in FIG. 1 illustrate the flow of water containing sand into filtration apparatus 10 from line 22. Upon entering filtration space 38 within chamber 30, the inflowing water immediately would make contact with solid end plate 60, and be diverted in the direction of arrows 94 through annular flow space 31 between the inner wall portion of chamber 30 and the filtration element 50. This flow of water would then flow inwardly in the direction of arrows 97 through support screen 54, primary filter screen 56 thence into internal flow space 100 and would flow out through the flow bore 68 in the direction of arrows 99 to continue on as a filter clean water through line 22 as seen in phantom view. It is crucial to note that flow of water into the internal filter chamber 30 being turbulent at its entry point would facilitate in moving any sand or the like which may have collected on the floor of chamber 30 to be moved further into down collection spout 112 so that the sand may be collected within chamber 114. In addition, it should be noted that since water flow is constantly flowing through chamber 30, a portion of the water flow would be directed in the direction of arrows 113 and to collection zone 114, and would cause some turbulence within container 114. However, in view of the fact that the sand or the like is collecting at the very bottom portion of collection chamber 114, it is not foreseen that the sand would be carried upward back into the primary filtration area 38 during filtration process.

For purposes of cleaning and the like, it should noted as seen in FIG. 2 that exit spout 76 is provided with beveled sides 78 so that it may be removed via a wrench or the like so that the filter element 50 may be changed or cleaned from time to time.

As an alternate embodiment of the filtration system, FIG. 2 illustrates in phantom view a modification which is easily adaptable to the present invention. This modification would be a standard "stop-cock" 130 contained within the lower flow passage 110, so that when placed in the closed position, fluid and debris could not flow from within chamber 30 down into collection chamber 114. The stop-cock would be closed in the event collection chamber 114 would have to be cleaned or washed by simply threadably disengaging it from neck portion 112 yet the primary filtration element could be in continued use without loss of any water from spout 112.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A filtration apparatus in a fluid flow line, comprising:
   a. filter housing having a fluid intake port and a fluid outflow port;
   b. a filter element positioned within the filter housing and connectably engaged to the outflow port, said filter element further comprising:
      i. an annular screen portion extending substantially the length of the filter element for supporting the filter element within the filter housing; and
      ii. a primary filter layer positioned interior to the filter screen defining an interior filtrate collection zone, for filtering particles out of the fluid flow flowing into the filtrate collection zone from the filter chamber;
   c. means on that portion of the filter housing adjacent the fluid intake port, for contacting the fluid flowing into the filter housing and to direct the fluid flow from external of the filter element into the filtration collection zone of the filter element, so that the particles contained within the fluid flow are restricted from flowing to the filtration collection zone of the filter element and is maintained on the exterior of the filter element; and
   d. means for collecting any particles maintained on the exterior of the filter element, said means located exterior to the filter housing.

2. The apparatus in claim 1, wherein the filter housing further comprises an end cap portion which threadably engages to the filter housing and threadably engages to the filter element for providing a flow passage between the filter element and exterior to the filter housing.

3. The apparatus in claim 1, wherein the filter element is connectably engaged on a first end to the filter housing and is free standing on its second end.

4. The apparatus in claim 1, wherein the means for directing the fluid flow along the wall of the filter element further includes a solid end plate on the filter element so that water entering the filter housing makes initial contact with the solid end plate and flows therearound to the wall of the filter element.

5. The apparatus in claim 1, wherein there is further included an upper cleanout portion on the filter housing.

6. The apparatus in claim 1, wherein the means for collecting the debris off of the filter includes a collection chamber threadably engaged to the lowermost portion of the filter housing, for collecting the debris through gravity falling from the filter element flowing down into the collection chamber.

7. A filter positioned along a water well line intermediate the water well and the well pump, the filter comprising:
 a. a primary filter housing positioned along the water flow line, the housing having a water intake for allowing water to flow into the housing on the first end and a water outflow portion on its second end, and defining a filtration zone there within;
 b. a filtration element housed within the filter housing, the element fixedly engaged onto the output portion of the filter housing and supported substantially within the length and internal of the filter housing, the diameter of the filter element being less than the internal diameter of the filter housing for defining a fluid flow space there between;
 c. a primary filtration layer on the filter element, for maintaining any debris within the fluid flow on the exterior of the filter element, and allowing filtered water flowing out of the outflow portion;
 d. a screen layer exterior to the filtration layer for supporting the filter housing along its length as it is attached to the outflow port;
 e. a plate member on the end portion of the filter housing adjacent the intake portion, for receiving fluid flowing into the filter housing and contacting the plate member so that fluid flows around the end plate and into the fluid flow space along the housing, along the length of the filter and is directed through the filter material for flowing out of the outflow portion; and
 f. collection means engaged to the lowermost portion of the housing for providing a collection zone for the debris collected on the filter housing to flow out of the filter housing and into the collection zone so that the debris is collected exterior to the filter housing.

8. The apparatus in claim 7, wherein the filter element filters out debris greater than 40 microns in diameter.

9. The apparatus in claim 7, wherein the filter element receives fluid flow along a continuous annular wall.

10. The apparatus in claim 7, further comprising means to interrupt flow to the collection means to allow removal of the collection means for cleaning yet allow filtration to continue.

* * * * *